US011500755B1

(12) United States Patent
Plenderleith et al.

(10) Patent No.: US 11,500,755 B1
(45) Date of Patent: Nov. 15, 2022

(54) DATABASE PERFORMANCE DEGRADATION DETECTION AND PREVENTION

(71) Applicant: Amazon Technologies, Inc., Seattle, WA (US)

(72) Inventors: Jamie Plenderleith, Dublin (IE); Monika Marta Gnyp, Maynooth (IE)

(73) Assignee: Amazon Technologies, Inc., Seattle, WA (US)

( * ) Notice: Subject to any disclaimer, the term of this patent is extended or adjusted under 35 U.S.C. 154(b) by 835 days.

(21) Appl. No.: 16/400,574

(22) Filed: May 1, 2019

(51) Int. Cl.
*G06F 16/2453* (2019.01)
*G06F 16/2455* (2019.01)
*G06F 16/248* (2019.01)
*G06F 11/34* (2006.01)
*G06F 8/71* (2018.01)
(Continued)

(52) U.S. Cl.
CPC ............ *G06F 11/3419* (2013.01); *G06F 8/71* (2013.01); *G06F 11/3495* (2013.01); *G06F 16/24542* (2019.01); *G06F 16/316* (2019.01); *G06F 11/3034* (2013.01); *G06F 11/3409* (2013.01); *G06F 11/3612* (2013.01); *G06F 11/3624* (2013.01); *G06F 16/2272* (2019.01); *G06F 16/248* (2019.01); *G06F 16/2454* (2019.01); *G06F 16/2455* (2019.01);
(Continued)

(58) Field of Classification Search
CPC ............ G06F 11/3419; G06F 11/3495; G06F 11/3409; G06F 11/3034; G06F 11/3612; G06F 11/3624; G06F 16/316; G06F 16/24542; G06F 16/2454; G06F 16/248; G06F 16/2455; G06F 16/24556; G06F 16/24539; G06F 16/217; G06F 16/2272; G06F 16/213; G06F 16/2228; G06F 16/24575; G06F 8/71
See application file for complete search history.

(56) References Cited

U.S. PATENT DOCUMENTS 7,272,589 B1* 9/2007 Guay ...................... G06F 16/22
707/999.005
2005/0187917 A1* 8/2005 Lawande .............. G06F 16/217
(Continued)

OTHER PUBLICATIONS

Ziehen Xu et al., Exploring Power-Performance Tradeoffs in Database Systems, 2010 IEEE, [Retrieved on Jul. 11, 2022]. Retrieved from the internet: <URL: https://ieeexplore.ieee.org/stamp/stamp.jsp?tp=&arnumber=5447840> 12 Pages (485-496) (Year: 2010).*
(Continued)

*Primary Examiner* — Anibal Rivera
(74) *Attorney, Agent, or Firm* — Nicholson De Vos Webster & Elliott, LLP

(57) ABSTRACT

Techniques for database performance degradation detection and prevention are described. A statement performance monitor observes queries executed against a database engine and clusters the queries into groups of queries. The index utilization of the query groups and execution metrics are tracked over time, and a sudden change of index utilization can be detected. The change can be reported to users and/or new indexes may be automatically generated to serve affected query groups. Additionally, a statement performance monitor may be deployed to statically analyze code to identify modified queries and the resultant change of use of query indexes.

20 Claims, 9 Drawing Sheets

(51) Int. Cl.
    *G06F 16/31*     (2019.01)
    *G06F 11/30*     (2006.01)
    *G06F 11/36*     (2006.01)
    *G06F 16/22*     (2019.01)
    *G06F 16/2457*     (2019.01)

(52) U.S. Cl.
    CPC .. *G06F 16/24539* (2019.01); *G06F 16/24556* (2019.01); *G06F 16/24575* (2019.01)

(56) References Cited

U.S. PATENT DOCUMENTS

| | | | | |
|---|---|---|---|---|
| 2006/0242102 | A1* | 10/2006 | Bruno | G06F 16/22 |
| 2009/0228446 | A1* | 9/2009 | Anzai | G06F 16/284 |
| 2010/0332473 | A1* | 12/2010 | Brodsky | G06F 8/75 |
| | | | | 707/736 |
| 2017/0300517 | A1* | 10/2017 | Amirsoleymani | G06F 16/2272 |
| 2018/0096006 | A1* | 4/2018 | Das | G06F 16/221 |
| 2019/0034463 | A1* | 1/2019 | Jeong | G06F 12/00 |
| 2020/0042524 | A1* | 2/2020 | Zait | G06F 16/217 |

OTHER PUBLICATIONS

Patrick O'neil et al., Improved query performance with variant indexes, 1997, [Retrieved on Jul. 11, 2022]. Retrieved from the internet : <URL: https://dl.acm.org/doi/pdf/10.1145/253260.253268> 12 Pages (38-49) (Year: 1997).*

* cited by examiner

EXPLAIN STATEMENT 302

```
EXPLAIN
SELECT     *
FROM       CUSTOMERS
WHERE      FIRSTNAME LIKE 'B%'
OR         LASTNAME LIKE 'L%';
```

EXPLAIN STATEMENT RESPONSE 304

IDENTIFIED INDEXES 306

```
            ID: 1
   SELECT_TYPE: SIMPLE
         TABLE: CUSTOMERS
    PARTITIONS: NULL
          TYPE: INDEX_MERGE
 POSSIBLE_KEYS: IDX_C_LN,IDX_C_FN,IDX_NAME_FL,IDX_NAME_LF
           KEY: IDX_C_FN,IDX_C_LN
       KEY_LEN: 52,52
           REF: NULL
          ROWS: 16
      FILTERED: 100.00
         EXTRA: USING SORT_UNION(IDX_C_FN,IDX_C_LN); USING WHERE
1 ROW IN SET, 1 WARNING (0.00 SEC)
```

*FIG. 3*

DATABASE PERFORMANCE DEGRADATION DETECTION AND PREVENTION

BACKGROUND

Many companies and other organizations operate computer networks that interconnect numerous computing systems to support their operations, such as where computing systems are co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Many public data center operators, such as service providers who operate service provider networks, offer their customers a variety of resources as services. For example, one popular set of services involve databases, where customers may utilize various types of databases such as relational databases often used for transactional applications, non-relational databases for internet-scale applications, data warehouses for analytics applications, in-memory data stores for caching and/or real-time workloads, graph databases for building applications with highly-connected data, time-series databases for measuring changes over time or predicting future time-series values, ledger databases to maintain verifiable records of transactions, etc. Accordingly, many types of applications fundamentally rely on databases to provide many different services and functionalities. Thus, the performance of database systems, therefore, directly affects the performance of these different applications.

BRIEF DESCRIPTION OF DRAWINGS

Various embodiments in accordance with the present disclosure will be described with reference to the drawings, in which:

FIG. 3 is a diagram illustrating an explain database statement and execution plan index identification according to some embodiments.

DETAILED DESCRIPTION

Various embodiments of methods, apparatus, systems, and non-transitory computer-readable storage media for database performance degradation detection and prevention are described. According to some embodiments, a statement performance monitor can detect a sudden non-utilization of a database index or detect a change that would lead to non-utilization of a database index. In some embodiments, a statement performance monitor monitors database statements (also referred to herein synonymously as "queries") issued to a database over time and detect when those database statements will not, or did not, utilize the same indexes as before. The statement performance monitor may then detect various changes—to the database or tables and/or to application client code that issues queries against these tables—that may have inadvertently changed the way that queries are processed by preventing the database engine from using database indexes for certain queries, which can significantly affect performance of the database and thus, the applications utilizing those databases.

The statement performance monitor may monitor database queries issued over time, create groupings of similar queries, determine which indexes are utilized by each group of queries, and analyze whether these groups of queries would still use the same indexes, e.g., via periodic analysis, by on-demand analysis triggered by other query-related metrics satisfying some criterion, etc. The statement performance monitor may notify one or more users associated with the database or application (who may then address the issue, such as by creating indexes or changing application code), automatically create additional indexes to eliminate the problem, etc.

A statement performance monitor, in some embodiments, analyzes code changes made to an application via static code analysis to detect scenarios in which a code change may cause a query to no longer be processed using an index. The statement performance monitor may notify a code submitting user about the issue, block a deployment of the code, etc., to prevent the application from degrading as a result.

As a result, various embodiments disclosed may provide various technical benefits, including but not limited to preventing a database from suffering from a significant performance degradation (e.g., by no longer being able to use indexes, and instead needing to perform slow table scans) and thus, prevent applications relying on the database from similarly suffering a degradation of performance. Embodiments may prevent unused indexes from accumulating and remaining in storage (e.g., on disk or in a memory), where they may "waste" large amounts of storage that could be more productively used.

Figure 1:
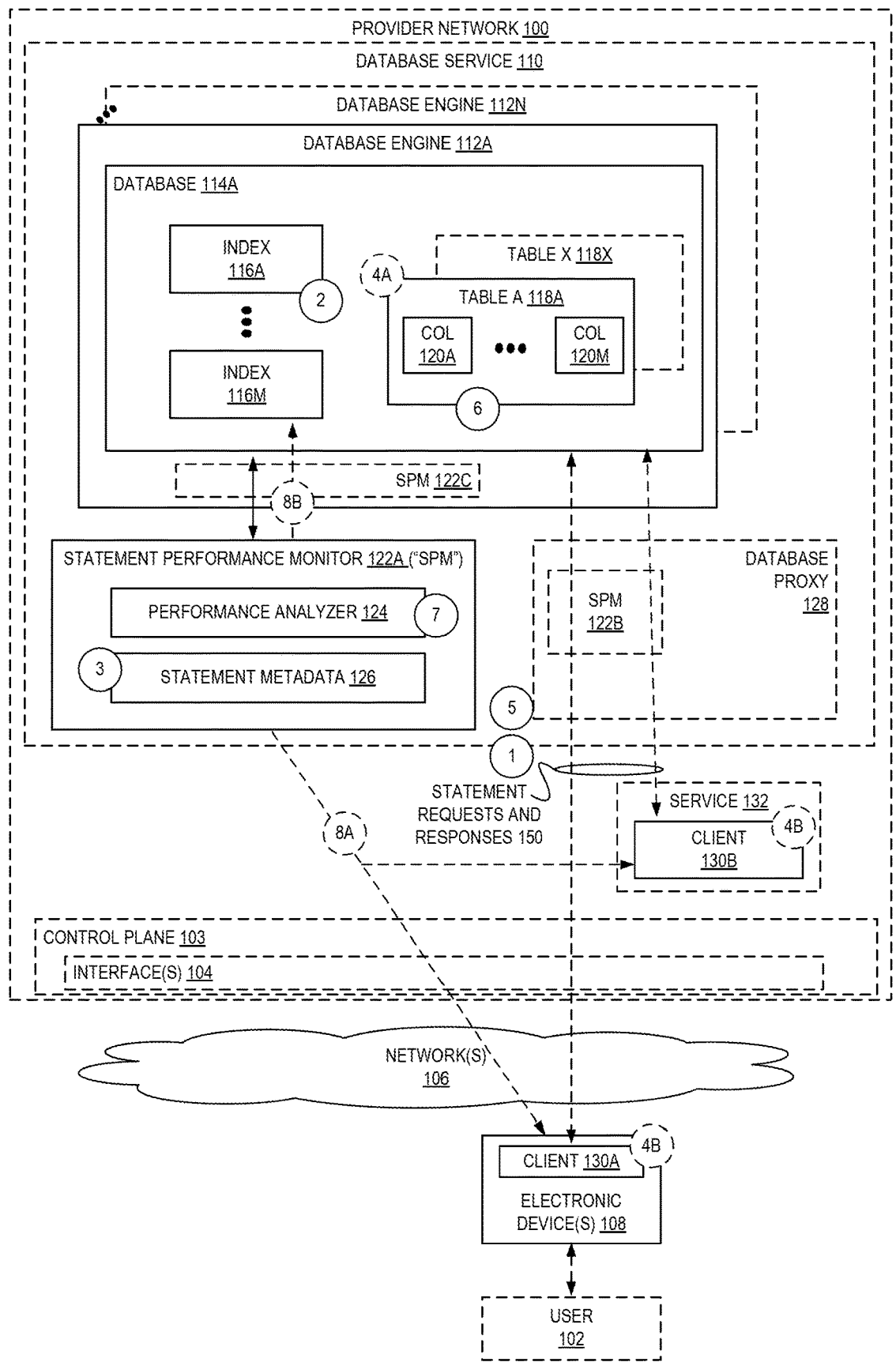
FIG. 1 is a diagram illustrating an exemplary environment for database performance degradation detection and prevention according to some embodiments.

FIG. 1 is a diagram illustrating an exemplary environment for database performance degradation detection and prevention according to some embodiments. In FIG. 1, one or more databases 114A are shown as being implemented by one or more database engines 112A-112N. In some embodiments, the database(s) 114A are provided within a provider network 100, which may offer users access to a variety of computing-related services.

Generally speaking, a provider network 100 provides users with the ability to utilize one or more of a variety of types of computing-related resources such as compute resources (e.g., executing VM instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users 102 may interact with a provider network 100 across one or more intermediate networks 106 (e.g., the internet) via one or more interface(s) 104, such as through use of API calls, via a console implemented as a website or application, etc. The interface(s) 104 may be part of, or serve as a front-end to, a control plane 103 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved).

For example, in various embodiments, a "serverless" function may include code provided by a user or other entity that can be executed on demand Serverless functions may be maintained within provider network 100 and may be associated with a particular user or account or may be generally accessible to multiple users and/or multiple accounts. Each serverless function may be associated with a URL, URI, or other reference, which may be used to call the serverless function. Each serverless function may be executed by a compute instance, such as a virtual machine, container, etc., when triggered or invoked. In some embodiments, a serverless function can be invoked through an API call or a specially formatted HTTP request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

By way of example, various components described herein can be executed as serverless functions, e.g., a database proxy 128, a statement performance monitor 122, clients 130B, etc.

Another service that may be provided by a provider network 100 is a database service 110. The database service 110 may be implemented as one or more software modules executed by one or more computing devices of a provider network 100. The database service 110 may be a managed service that makes it easy for users to set up, operate, and scale databases 114 in the provider network 100 in the form of database instances (not illustrated). The database service 110 may rely on the virtualization techniques described above to allocate the compute and storage resources to provide a database instance. For example, the database service 110 may provision resources of one or more host devices to host a database instance. The database service 110 may provide resizable capacity while managing time-consuming database administration tasks. The database service 110 may provide one or more of a variety of database engines 112A-112N (e.g., relational database engines such as MySQL, MariaDB, Oracle, SQL Server, PostgreSQL, etc., and/or non-relational database engines) allowing existing code, applications, and/or tools to work seamlessly with databases provided by the database service 110. In some embodiments, the database service 110 may perform administrative tasks such as automatically backing up databases, upgrading and/or patching database software, scaling the compute resources or storage capacity associated with its database instances, etc.

Users 102 of the provider network 100 may interact with the database service 110 to implement one or more databases 114, which may include the user 102 utilizing a console of a web-based application (provided via a client 130A) to issue one or more requests to an endpoint (or other interface 104) associated with the database service 110 indicating the user's 102 desire to launch/configure one or more databases 114. A management engine or controller (not illustrated) of the database service 110 may then, in response, perform operations to obtain compute resources (e.g., virtual machines (VMs) executed by host device(s)) for the database 114 instance(s) within the provider network 100, launch VM images (optionally having code for the database pre-installed), optionally launch or install databases on the host device(s), configure the database instances, configure security rules and/or permissions used by the databases 114 or used for accessing the databases, etc.

Thereafter, database clients 130A-130B may issue queries to a database 114A instance to read/write data from/to the database. Such database client applications may be executed by electronic devices inside of the provider network 100 (e.g., hosted on a VM as client 130B, which may be part of a service 132 such as a hardware virtualization service, on-demand code execution service, or the like) or outside of the provider network 100 (as client 130A) and interact with the database instances via network(s) 106 and interface(s) 104. As used herein and commonly in the field, the terms "statement" (e.g., text that indicates a command to a database, such as a SELECT statement, UPDATE statement, DELETE statement, etc.) and "query" (e.g., SELECT statements or other commands to retrieve data based on specific criteria) may be used somewhat interchangeably and are to be interpreted as such unless otherwise indicated or made clear by the context of use.

In some embodiments, database client applications may interact with databases via a database proxy 128, which may be implemented using software that is communicatively coupled between the client applications and the databases 114. A database proxy 128 may be deployed in a transparent manner and thus provide interactions between database clients and databases according to a same database interface so that the database clients and databases behave as if communications were directly passed between the database clients and databases. For example, the database proxy 128 may receive access requests (e.g., database queries) from database clients formatted according to a database interface, may optionally process these requests, and pass on the requests to the databases. Similarly, the database proxy 128 may receive responses from the databases, optionally process these responses and modify them, and pass on the original responses or modified responses back to the clients.

These interactions between database clients, database proxies, and/or databases as described herein may be implemented according to different technologies, including, but not limited to, utilizing vendor-specific native application programming interfaces (APIs) or APIs utilizing Simple Object Access Protocol (SOAP) or Representational state transfer (REST) technologies. SOAP is a protocol for exchanging information in the context of network-based services. REST is an architectural style for distributed hypermedia systems. A RESTful API (which may also be referred to as a RESTful network-based service) is a network-based service API implemented using HyperText Transport Protocol (HTTP) and REST technology. The interfaces described herein may in some embodiments be wrapped with client libraries in various languages, including, but not limited to, C, C++, Java, C# and Perl to support integration with databases, such as databases 114.

As alluded to above, a variety of scenarios involving databases that result in database indexes 116A-116M no longer being utilized occur in a variety of environments. Generally, a database index is a data structure that improves the speed of data retrieval operations on a database table. Indexes are typically used to quickly locate data (e.g., using a small data structure, that may reside within a relatively "fast" memory such RAM) without having to search every row in a database table (e.g., perform a table scan, which often involves reading from a persistent-type storage medium such as a magnetic disk or SSD) every time a database table is accessed. Indexes are typically created using one or more columns of a database table, providing the basis for both rapid random lookups and efficient access of ordered records. An index typically is a copy of selected columns of data from a table (such as a column of unique identifiers in the form of integers, which can be searched very efficiently) that may also include low-level disk block addresses/links pointing to the complete "row" of data it was copied from (which typically includes other larger data elements of interest).

Notably, in many cases the order that the index definition defines the columns in is important, as it is typically possible to retrieve a set of row identifiers using only the first indexed column, but it is typically not possible or efficient to retrieve the set of row identifiers using only the second or greater indexed column. Accordingly, in some embodiments a client that previously provided the proper columns in a query allowing the database engine to successfully use an index, the client may change (e.g., due to a code change) to using fewer or different columns in the query, which may eliminate the database engine's ability to use the index—instead, in many cases a full table scan is required, which means that the database engine must scan through every single record/row in its table—often from a relatively slow disk—to find all rows satisfying some condition (e.g., where a first ID=some value).

Additionally, a subtle change in a datatype used in a query or in the database schema may affect the ability to successfully utilize indexes. As one example, in some scenarios where a table has a column of type "varchar" and an index on this column, yet where a query is issued that includes an explicit cast to a related but different type (e.g., nvarchar), most software engineers would not see any issue with this mismatch and would believe the index would be properly used. However, the query optimizer of the database engine may be unable to use the index due to some database engines having prohibitions for automatically "implicitly" converting between some datatypes. For example, some databases may convert a query with a varchar value into an nvarchar to use with an nvarchar index, but this same database may be unable to losslessly convert an nvarchar value into a varchar. The same may hold true with other datatypes, e.g., a char may be converted to nchar, but a nchar may not be converted into a char, etc. Additionally or alternatively, if an underlying column of a database is changed (e.g., from varchar to nvarchar) while the existing index remains utilizing varchar, a query that arrives to be processed with an nvarchar value may not be able to utilize the index due to the datatype mismatch between the query and the index. Thus, if a query suddenly uses a slightly different data type, or a column in the database is changed to be of a slightly different type, the database may no longer be able to use previous indexes involving that column as it may not include the proper amount or type of information needed from the query. As a result, for a single database potentially a huge number of indexes may be sitting on disk that are completely unused, wasting space. Additionally, queries may be issued and processed without the use of indexes—despite the developer assuming indexes are being used—resulting in slow performance on the part of the database.

Further complicating matters is the fact that this performance degradation may, in some cases, go undetected by developers. Moreover, the detection of the degradation also leads to wasted developer time and frustration, as identifying the cause of "sudden slowness" on the part of the database may be difficult to detect. In particular, it may not immediately be apparent that an index is not being used, and it may not immediately be apparent what change(s) lead to that non-utilization, which could be in application logic that created the query or in a change to the database schema.

For example, a sudden non-usage of an index may not even be detected by a developer testing out code in a developmental environment that typically has an abundance of computing resources (e.g., CPU, RAM, etc.), a light traffic load, and/or may test upon a near-empty database (e.g., 1000 records, as compared to a "full" production database likely having much, much more data such as 100 million records or more). In this setting, a database's need to perform full table scans—which potentially may be done in memory in this resource-rich and/or data constrained developmental environment—may hide the problem. Further, it is often difficult for developers to obtain the actual queries that are executed against a database, as queries in many modern systems are generated by use of libraries or frameworks (e.g., an object-relational mapping (ORM) tool) that abstract the actual query from the developer. Thus, to catch the issue, a developer may need to know to run a profiler to identify the actual queries (i.e., SQL queries) being run, issue an "EXPLAIN" command to determine how the database is actually executing the query, obtain the output and be able to understand this output to determine that an index is not being utilized. However, this is not a simple process for most developers as these tasks require substantial domain-specific expertise that most developers do not possess. Even further complicating the problem is that some queries may appear to use some index and actually use that index, though the index used is not the one that is supposed to be used. In this case, it is hard for a human to know that it isn't an ideal index.

Accordingly, in some embodiments a statement performance monitor 122 (or "SPM") is provided that can, in effect, cluster or group various queries together and determine a mapping between queries and what indexes they use. As many queries are built by application code, they tend to look the same or extremely similar. The SPM 122 may identify these patterns, where only some values/parameters change, to identify groups of queries. The SPM 122 may, for each group of queries, identify which indexes are used by which groups and thus can determine that queries matching a particular pattern typically hit a particular index. Thus, by observing queries over time, the SPM 122 can detect instances in which a particular query (of a particular "type" or group of queries) is not processed using the expected index(es), the SPM 122 can take some responsive action, e.g., notifying the client, associated user(s), and/or owners or administrators of the database, automatically creating additional indexes that could be used to process that query, etc.

Turning to FIG. 1, with regard to the illustrated circle (1), one or more clients 130A-130B may issue statements/queries (shown as statement requests and responses 150) involving one or more databases 114A to be processed by one or more database engines 112A-112N, which return results to the client(s) 130A-130B in the form of responses. These queries may be processed by the database engine 112A using one or more indexes 116A-116M at circle (2), each referencing one or more (and typically fewer than all) columns 120A-120M of one or more tables 118A-118X.

In some embodiments, the SPM 122 may be implemented (e.g., as a software module) of a database proxy 128 as SPM 122B, and thus may directly receive and have visibility into the statements 150 being issued. For example, the SPM 122B may act as a transparent proxy and may have access to the plaintext statements being sent in traffic before forwarding on the traffic, or the SPM 122B may act as a reverse proxy and thus terminate connections with the client(s), allowing the SPM 122B to (optionally) decrypt statement traffic sent in an encrypted form (e.g., via TLS). Other related proxy deployments can also be used known to those of skill in the art. The SPM 122 may also be implemented as a module within a particular database engine, such as SPM 122C that is implemented as part of database engine 112A, or as a separate entity such as SPM 122A, which may (or may not) be a part of a same database service 110 as that which provides the database engine(s) 112A-112N.

Alternatively or additionally, in some embodiments the SPM 122A is not communicatively coupled inline between clients and the database engines, but rather indirectly detects the statements.

For example, in some embodiments the SPM 122A may periodically send requests to the one or more database engines 112 for information describing what queries each is currently processing, which is returned to the SPM 122A. Alternatively, the SPM 122A may monitor some sort of log(s) written to by the database engine(s) 112 that include the queries themselves, or the database engines could be modified to store/write incoming queries (or "cleansed" versions thereof, such as to remove confidential or sensitive information) to some location—e.g., a database table, in file(s) at a storage location (e.g., of a storage service), to a monitoring service, etc.

Figure 2:
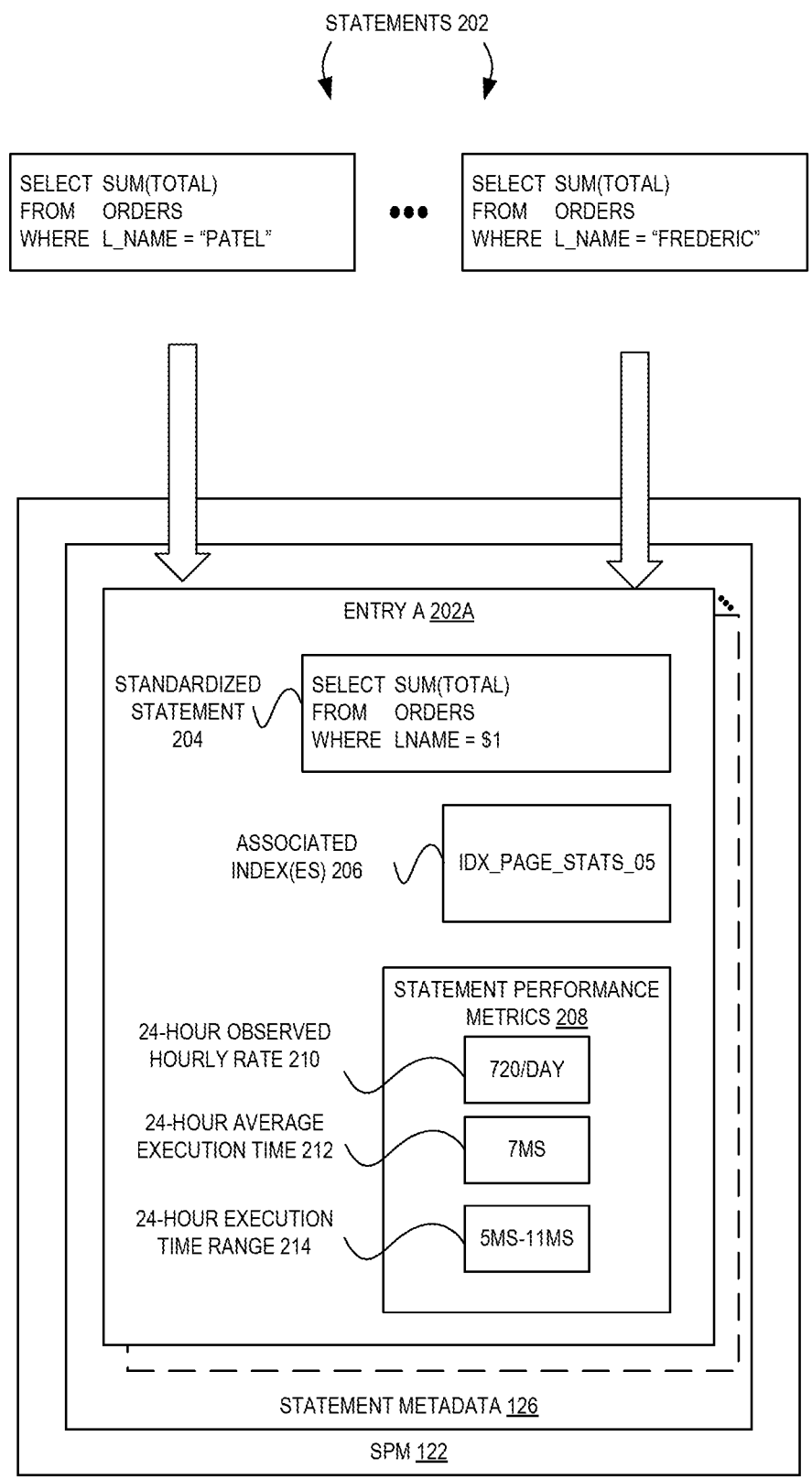
FIG. 2 is a diagram illustrating database statement standardization and statement metadata according to some embodiments.

Regardless of the particular deployment, in some embodiments the SPM 122A may process the queries to update statement metadata 126 at circle (3). FIG. 2 is a diagram illustrating database statement standardization and statement metadata according to some embodiments. As indicated above, the SPM 122 in some embodiments is able to observe numerous queries issued to one or more databases. The SPM 122 may group or cluster these queries together according to similarities therebetween, and maintain statement metadata 126 regarding queries belong to a group. As one example, a set of statements 202 are shown in FIG. 2 that may belong to a same group—in this case, each statement provides a similar query where only the predicates of the WHERE clause differ. Here, a first statement is shown with a L_NAME='PATEL' predicate (where PATEL is referred to as an expression of the predicate) while another statement is shown with a L_NAME='FREDERIC' predicate (again, where FREDERIC is an expression). Notably, these queries both involve a same table, have a same SELECT clause, and a same WHERE clause (aside from the difference in expressions)—thus, these queries both would be executed in a structurally same manner by a database engine.

To determine this equivalency, in this example the SPM 122 may "standardize" these queries by replacing certain expressions (e.g., in the WHERE clause) with placeholders, though there are other techniques for removing entropy known to those of skill in the art. In this example, the statements 202 are standardized by replacing each expression in the query with a placeholder value in a consistent manner. For example, a first removed expression may be replaced with S1, while a second removed expression may be replaced with S2, and so on. By performing standardization in a consistent manner, the SPM 122 can simply perform a string comparison to determine whether two different statements are equivalent and thus belong to a same group/cluster. This standardized statement 204 (or a representation or identifier thereof, such as a hash value taken of the standardized statement 204) may be stored in a first entry 202A.

For each group, the SPM 122 may determine which indexes of the database are utilized. In some embodiments, the SPM 122 may issue a command (e.g., an EXPLAIN or EXPLAIN PLAN statement, which identifies the statement or a standardized statement) to the database engine to obtain information describing how precisely the database engine would process the statement. For example, FIG. 3 is a diagram illustrating an explain database statement 302 and execution plan index identification according to some embodiments. In this example, an exemplary explain statement 302 (supported by some databases) is illustrated that includes an "EXPLAIN" command together with a particular query. A query optimizer of the database engine processes this query to generate an execution plan, which is returned in text form as part of an explain statement response 304. The SPM 122 can be configured to be able to parse such responses from any involved database engines to identify what—if any—database indexes would be used to process the query. In this example, two identified indexes 306 are indicated as being used—"IDX_C_FN" and "IDX_C_LN." Turning back to FIG. 2, identifiers (e.g., names) of any identified indexes to be used for processing a query can be stored in the entry 202A.

The SPM 122, in some embodiments, also keeps track of statement performance metrics 208 that describe the execution of queries of the group. For example, the SPM 122 may track a rate at which queries of the group are seen (here, a 24-hour observed hourly rate 210), an average execution time of queries of the group (here, a 24-hour average execution time 212), a particular statistical range of execution times of queries of the group (here, a 24-hour execution time range 214 that could represent the highest and lowest observed latencies, the $5^{th}$ percentile and $95^{th}$ percentile, etc.). Of course, more, fewer, and/or different performance related metrics can be tracked by the SPM 122 in other embodiments, and this example is to be viewed as illustrative and not limiting. This tracking of statement performance metrics 208 may be implemented in a variety of ways. For example, when the SPM 122 is implemented as part of a database proxy (as optionally reflected in FIG. 1), the SPM 122 has immediate visibility into the data necessary to track these values—e.g., a number of statements that arrive that belong to a group (for determining a rate of observation), the time between when the SPM 122 sends a statement to the database (or receives a statement) and when the response is returned (for determining execution times), etc. In other cases, such as when the SPM 122 is deployed in a non-inline manner, the SPM 122 may perform any, multiple, or all of sending a request to the database engine(s) for statistics, monitoring a log or storage location that is written to by the database engine(s) or otherwise populated based on data output by the database engine(s), etc.

Turning back to FIG. 1, after some amount of time the SPM 122 may have developed a relatively stable set of statement metadata 126 entries (or a subset thereof).

Thereafter, at some point in time, one or more changes to the structure of the tables 118 or indexes 116 may occur as shown at circle (4A) and/or one or more changes to the client 130 code may occur as shown at circle (4B). For example, a new version of a client 130 application may be installed or utilized that includes changes to query-generating code, or a database administrator or developer may change a column type of a table 118 (e.g., from "nvarchar" to "varchar" or the like) or even change an index (e.g., deleting it). For the sake of example, we assume that some such change occurs that affects the ability of the database to utilize an index for a type (i.e., group) of query/statement.

Thereafter, another statement may be issued by a client 130 as shown at circle (5) that arrives at the database engine 112A, which at circle (6) can no longer use the index (e.g., index 116A) it previously used. Typically, the processing of this statement will take significantly more time than similar statements issued before the change(s), as one or more full table scans may need to be used instead of simply accessing an index that may potentially be small enough to stay in memory. Thus, the query may take additional time to execute, which may be many orders of magnitude larger. In a best case, this does not have significant impact on the database and application, but in many cases, this can completely halt the database from being able to process queries in a timely manner, potentially crashing any applications that rely upon the database.

Thereafter, at circle (7), the SPM 122 can detect the non-utilization of the index. This detection can be implemented in different ways depending upon the particular environment and preferences of the implementor.

For example, in some embodiments, a performance analyzer 124 software module of the SPM 122 may periodically interact with the database engine(s) 112 to "test" the index utilization for each type of query the SPM 122 is tracking (e.g., each entry of the statement metadata 126). Thus, the SPM 122 may "test" each query by sending an EXPLAIN statement to the associated database engine(s) (with an actual query belonging to the group that may have been cached, or a standardized query, depending upon the particular query engine) to obtain a query execution plan and verify that the index(es) identified within the query execution plan response matches the index(es) tracked in the statement metadata 126 for that group of queries.

As another example, in some embodiments the performance analyzer 124 may issue commands to a database engine to report back which—if any—indexes are unused. For example, various types of SELECT queries are known to those of skill in the art that can be issued to a database engine (e.g., SQL Server) to obtain a list of unused indexes that have not been used in any seeks, scans, or lookup operations. The result from this query can thus be processed to identify non-utilized indexes.

Alternatively or additionally, the SPM 122 may also investigate particular ones of the query groups based on certain criteria based on the statement metadata 126. For example, in some embodiments the SPM 122 may determine a schedule for verifying the index use for a query group based on a rate in which those requests are seen (e.g., the 24-hour observed hourly rate 210)—if it is a "high" rate (as defined in the context of the implementation, or comparatively determined based on all observed rates) the performance analyzer 124 may investigate the index utilization of the query group more often, and for "lower" rates the performance analyzer 124 may investigate the index utilization of the query group less often. Alternatively, in some environments the performance analyzer 124 may be configured to investigate the index utilization of a query group more often—possibly with the observation of every query belonging to that group—if the rate in which those requests are seen is very low to ensure that the database is not in a "broken" state for any substantial period of time.

Similarly, the performance analyzer 124 may investigate the index utilization of particular query groups based on particular query response times. For example, the SPM 122 may identify an execution time for a recent/current query, and if that execution time satisfies some criterion involving the statement performance metrics 208, the performance analyzer 124 may investigate the index utilization. As one example, a configurable criterion may be set such that a query group's index use is checked if an observed execution time of a query in that group is seen that is some threshold amount greater than the 24-hour average execution time 212 (e.g., 50% greater, 2 times greater, etc.). As another example, a configurable criterion may be set such that a query group's index use is checked if an observed execution time of a query in that group is seen that lies some threshold amount outside of a time range, e.g., outside the 24-hour execution time range 214, or more than some threshold away from that range, and so on. Moreover, various combinations of these metrics can be flexible combined to specify a criterion based on the desires of the implementor.

Upon detecting an unexpected non-utilization of an index (or more generally, an unexpected change in index utilization), the SPM 122 may perform one or more responsive actions. The responsive action(s) may include, for example, sending a notification to an owner or administrator of the involved database, a user or customer account associated with the database or with requests that have been issued that utilize the database, a client 130, etc., as shown at circle (8A). For example, an owner or administrator of the database may specify who or what is to be notified (e.g., via telephone numbers, email addresses, account aliases, a storage location, etc.) and/or through what communicative channels (e.g., via a web console, email, text message, electronic message, etc.). This can alert a user or client as to the issue, and in response the user or client may investigate the issue, make some responsive change, etc.

Figure 4:
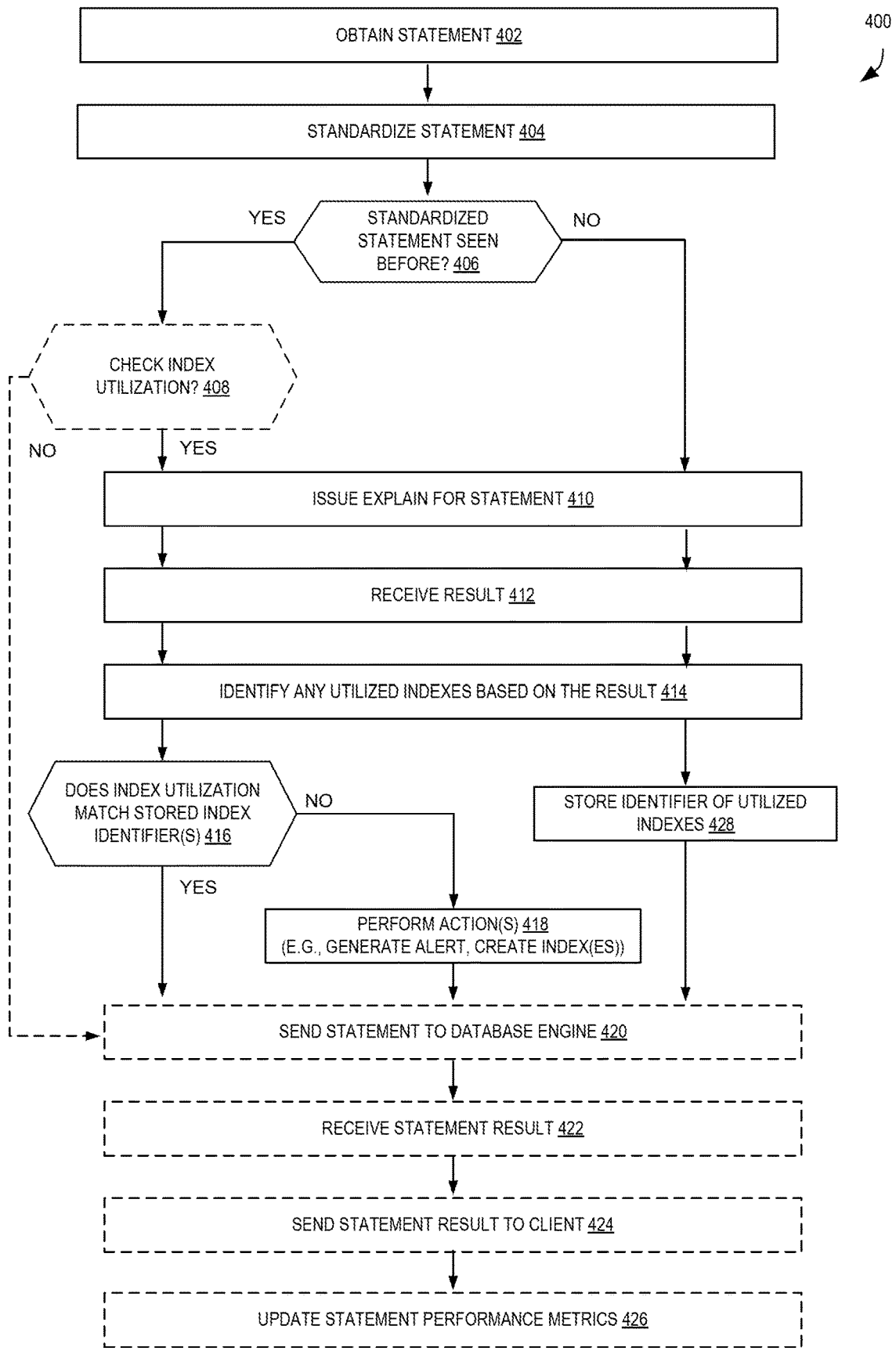
FIG. 4 is a flow diagram illustrating operations of a method for database performance degradation detection according to some embodiments.

Alternatively or additionally, the responsive action(s) may include automatically creating an index, as shown at circle (8B), that can be used by the database engine for processing queries of that query group. This can have the benefit of "fixing" the issue extremely rapidly to prevent any substantial performance degradation of the database or database-reliant applications. As one example, the SPM 122 can identify which columns are used in the query and may create an index having these columns (or a subset thereof, such as the first listed column, a first and second column, and the like). The ability of the SPM 122 to perform auto-creation on behalf of a user may be controlled by the user (e.g., an owner/administrator of the database), who may indicate that the SPM 122 may always create indexes as needed, may create indexes subject to some other condition being satisfied (e.g., some threshold amount of storage space is available, memory utilization falls beneath some threshold, the index is less than a particular size, etc.). As another example, the SPM 122 could interact with a database engine to determine whether the currently-utilized index(es), if any, are the "best" index(es) for the query, and if not could send a message identifying such a best index. For example, some database engines implement functionality that, when given a query, can identify a best index that could be used. The SPM 122 could obtain this "best" index from the database engine, determine whether that "best" index is in fact being used, and if not, notify a user. FIG. 4 is a flow diagram illustrating operations of a method 400 for database performance degradation detection according to some embodiments. Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by the SPM 122 of the other figures.

The operations 400 include, at block 402, obtaining a statement. The statement may be a SQL statement (e.g., a SELECT, UPDATE, INSERT, DELETE, etc.). Obtaining the statement may include receiving a SQL statement at a database proxy, or may include obtaining the statement by issuing a request to a database engine for a list of currently-executing queries, reading a query log that the database engine is writing to, etc.

The operations 400 include, at block 404, standardizing the statement. The standardization may include identifying particular portions of the statement and removing these portions or replacing these portions with placeholders according to a reproducible, consistent scheme. For example, particular expressions provided within a statement (e.g., the "Jones" part of the predicate "lastname='Jones'") may be identified and removed/replaced.

At decision block 406, the operations 400 include determining whether the standardized statement has been seen before. For example, block 406 may include determining whether the standardized statement exists within any cached entry of statement metadata tracked by the SPM.

If not, flow may continue to block 410, where the SPM 122 may issue an explain command for the statement—e.g., an EXPLAIN statement is sent to the database engine along with the statement, and at block 412 a result is received that includes the database-generated execution plan for the statement. At block 414, the operations 400 include identifying any utilized indexes based on the result—e.g., parsing the result to find any identifies of indexes in a known location of the result.

Optionally—such as when the operations are performed in a database proxy—the operations 400 may then continue to block 420, and sending the statement to the database engine, receiving a result at block 422, sending the result to the client 424 (that may have originally submitted the statement), and updating the statement performance metrics 426 based on the statement's execution.

When, at block 406, it is determined that the standardized statement has been seen before (e.g., by finding an entry having the same standardized statement, such as through a lookup into a data structure using the standardized statement or a value derived therefrom, such as a value resulting from the application of a hash or encryption function), the flow may optionally continue to decision block 408, where it is determined whether to check index utilization at this time. This decision may be based on one or more of the statement performance metrics 208, e.g., how frequent queries of the query group are seen, etc. If not, flow may continue to blocks 420 as described above. If so, flow may continue to block 410, 412, and 414 as described above, and then decision block 416 and determining whether the actual index utilization matches that which is known for the query group—e.g., identifiers of those indexes exist within the statement metadata for the query group. If not, the operations may include block 418 and performing one or more actions, e.g., generating and sending an alert message (e.g., an email, SMS, database INSERT command, etc.), auto-creating an index that could be used for queries of the query group, etc. Flow may then continue with blocks 420-426, similar to if decision block 416 results in determining that the index utilization does match the stored index identifiers for the query group.

Figure 5:
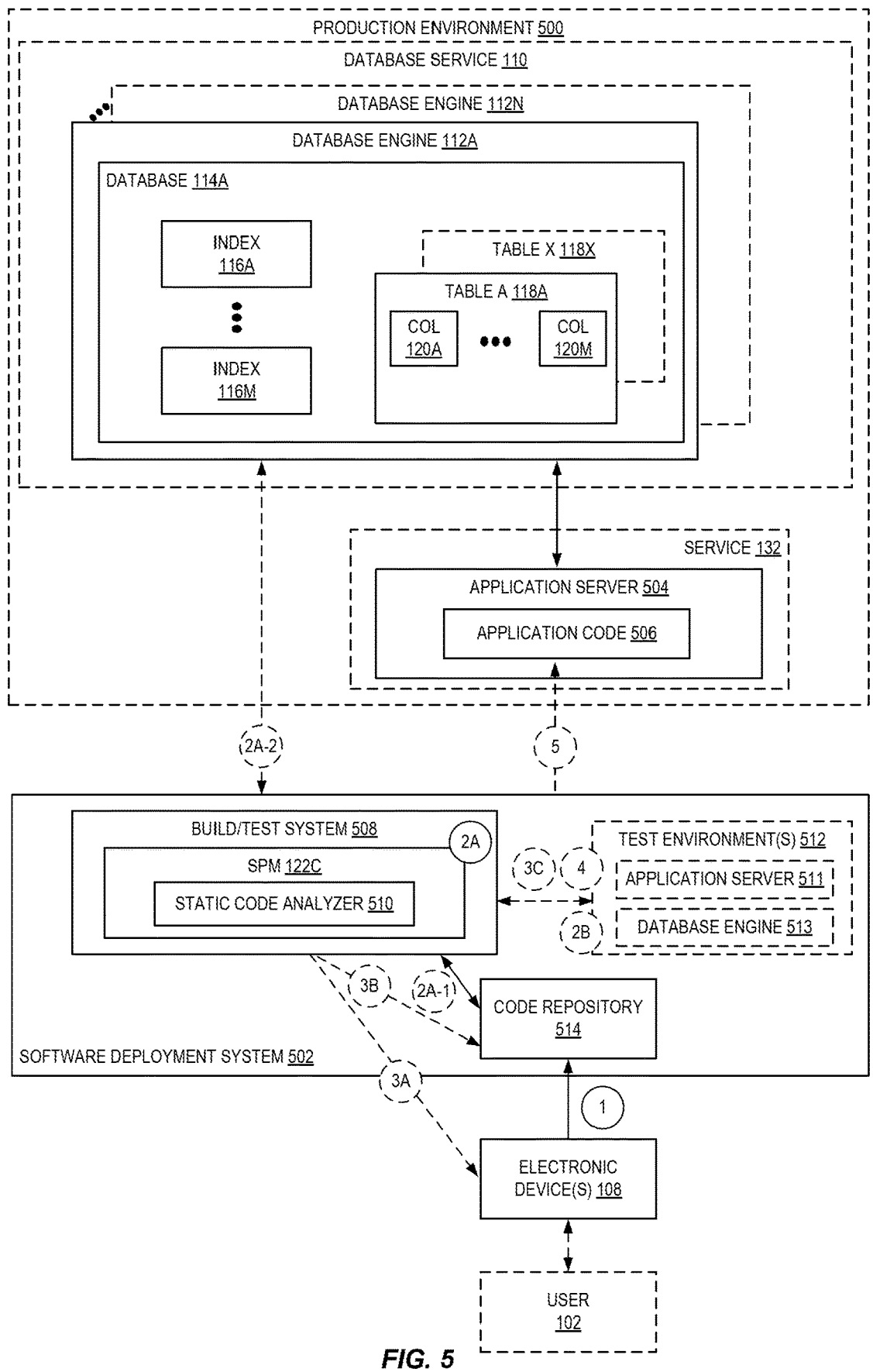
FIG. 5 is a diagram illustrating an exemplary software development environment for database performance degradation detection and prevention according to some embodiments.

The performance degradation detection and prevention techniques involving an SPM 122 can also be applied in other environments. For example, FIG. 5 is a diagram illustrating an exemplary software development environment for database performance degradation detection and prevention according to some embodiments. As shown in FIG. 5, an SPM 122 can be used as part of a software development system to detect code changes that may lead to database index utilization issues (e.g., the abandonment of previously well-suited indexes, the non-use of a suitable index, etc.) and potentially prevent those changes from being deployed into live production environments.

Despite database vendors putting significant effort into index optimizations, it remains easy for a software developer to fall into accidentally utilizing linear time table scans in their databases due to code that does not leverage indexes. For example, it is easy to imagine a developer who is not familiar with a database's schema and/or indexes who writes suboptimal SQL queries that could, in some cases, break a production system (e.g., due to timeouts on the client side while waiting for a database response). Not leveraging indexes can also cause table locks, as a database engine typically will lock the table while performing slow/long scans of data. This can then wreak havoc on other queries and users, who are all locked out from the table while the queries operate.

Moreover, with the introduction and utilization of automated code-deployment systems, it is increasingly easy for code changes that create these types of index problems to be automatically approved and pushed into production environments, potentially crippling the database and thus, the performance of the application that relies on the database. To this end, an SPM 122 can be used as part of a developmental process to analyze code and/or monitor database engine performance to detect and/or prevent inadvertent index-related performance issues such as index abandonment.

For example, as shown in FIG. 5, an SPM 122C may be integrated as a part of a build/test system 508, where a user 102 may submit a code change for an application at circle (1) to a code repository 514, which triggers the build/test system 508 to test the code. Generally, such environments may be used to automatically test and deploy code into production environments. This testing, by the build/test system 508, may include deploying the code into a test environment 512 (e.g., to an application server 511 that utilizes a database engine 513), running typical tests that may be specific to the environment and application type, and moreover, monitoring a set of query groups as described above. Alternatively or additionally, the testing may include performing static code analysis upon the code at circle (2A) using a static code analyzer 510 to detect changes to queries, and thereafter the SPM 122C can determine whether indexes exist that can satisfy such modified queries (e.g., via a cached list of indexes). Upon detecting the abandonment (i.e., sudden non-use of a previously-used index), the SPM 122C may cause the build/test system 508 to reject a build (and/or rollback a change introduced into the test environment 512 at circle (3C)) so that faulty code does not get moved on in a deployment pipeline, notify/warn the code-submitting user or a reviewer at circle (3), notify another user, rollback a code commit at circle (3B) from the code repository 514, and/or generate some sort of alarm. For example, by having access to a code repository, the SPM 122C may identify particular users and/or code commits that introduced such regressions and cause these users to be notified, particular commits to be reviewed, etc. Upon fixing the code via a proper submission so that it no longer abandons an index, the code may again be tested at circle (4) and eventually pushed to the production environment at circle (5)—e.g., to the application code 506 of application server 504.

Generally, static code analysis is the analysis of computer software that is performed without actually executing programs. The term is usually applied to the analysis performed by an automated tool. One can think of it as automated, computer-driven 'code reviewing' of the code based on well-known assumptions about chosen objectives such as performance optimizations, logical correctness, locating potential vulnerabilities etc. Embodiments disclosed herein can implement static code analysis techniques to scan existing application code and compare the code's queries to information present in the database schema. Embodiments can then warn developers when they've written code that may cause issues with an underlying relational database.

For further detail, some embodiments utilizing static analysis techniques include two techniques: one for the analysis of the software that makes queries to the database, and one for the analysis of the database schema.

Regarding the analysis of the code as shown at circle (2A-1), the static code analyzer 510 can leverage parsing rules for common languages and frameworks—e.g. Java/Spring, .Net/Linq2Sql, Ruby-on-rails, etc., to identify queries and/or infer the meaning of raw/dynamic SQL queries expressed within code. With this approach, the SPM 122C can identify the involved tables and the queries that might be issued. The SPM 122C, in some embodiments, can also record observed interactions against a database—e.g., via Microsoft Sql Server Profiler, which can list all statements issued to a database.

Regarding the analysis of the database schema, the SPM 122 can obtain the involved database's schema at circle (2A-2)—e.g., by analyzing a schema definition in source code (e.g., Microsoft SQL Server Projects emit the schema in easy-to-read .sql files with CREATE TABLE statements, CREATE INDEX statements, etc.). Alternatively or additionally, the SPM 122C may also interrogate a live database engine and ask it to describe its own schema, or the schema may be provided to the SPM 122C at some other point or points in time (e.g., by a database or other system).

The SPM 122C may then compare the queries that are predicted to be executed (based on the static code analysis) and compare them to the indexes known to exist (based on the schema analysis) to determine whether new queries are likely to cause issues or not and warn the user appropriately.

For example, a developer might modify some existing code to query against some new/different columns of a table based on new requirements—e.g., a desire to allow an application's users to be able to look up products by a particular field. If the developer is not diligent enough to verify that the new query will be covered by an index—which occurs quite frequently in practice—then these queries will require full table-scans on the part of the database engine. While a full table-scan probably wouldn't be problematic on a developer's own testing database having only a few records, or even in a Release Candidate database (as it probably doesn't have the same load as the production database), such a change can be annoying-to-catastrophic in production—e.g., due to a need for table locks.

Additionally, via analyzing database code, the static code analyzer 510 can also detect other scenarios that may or may not involve indexes, and issue warnings and/or recommendations in response.

As one example, the static code analyzer 510 may recommend the use of a particular index that exists that is not currently being used but could be. For the sake of illustration, a developer may have written code to generate a query using two identifiers as a key—e.g., having a WHERE clause similar to "WHERE first_id=X AND second_id=Y". In this case, we assume that there is no index on those two columns, or on either column independently. Thus, the query will not use an index. However, it may be the case that an index already exists that involves the first two fields but also a third field that wasn't being used (e.g., this may occur if the third field came first in the index definition). Thus, if the user were to provide a superfluous value for the third field in the query, the user could now leverage the index. Accordingly, the static code analyzer 510 may be able to identify this situation (e.g., detecting a non-use of any index, but that an index exists with additional columns), and report back a recommendation/notice to the developer detailing the situation. Thus, if the SPM 122 observes a query that doesn't use any index but determines that there are indexes that have the same (or similar) columns as the query, the SPM 122 may report back the existence of those indexes. As a result, the developer might be able to easily include additional information in the query—e.g., a customer ID, etc.—to immediately speed up the query while avoiding the need to create a new index, which would could take a long time, require potentially additional gigabytes or terabytes of storage, etc.

As another example, in some embodiments the SPM 122 can also detect a scenario where the addition of information to a query's SELECT clause may result in problematic index behavior. For example, some database engines provide "covering" indexes where each index entry also stores some associated data from other fields to satisfy the query without having to go to disk to read a full row. Accordingly, if a covering index exists on two columns, and it stores five other columns of data and a developer now wanted a sixth (via the addition of another column to the SELECT clause), the index will work but the database engine will still have to go back to the underlying data page to get actual data for the sixth column. As a result, adding an extra column to the SELECT clause may incur a performance hit, and additionally, all of the other data (the five columns) being cached in the covered index is "wasted" as the database engine still needs to go to data pages in storage to get needed underlying data. Accordingly, in some embodiments the SPM 122 can detect such scenarios and perform actions in response.

More generally, the SPM 122 may also in some embodiments configured to detect other improper or inefficient uses of databases—even potentially not involving indexes—and perform actions in response. For example, a section of code may be identified as problematic that issues a query to pull back a full set of records, and then uses these records only to determine a count (of the number of records that matched the query). The SPM 122 may flexibly detect such misuse through simple analysis rules, and potentially issue recommendations on how to improve the code—e.g., by replacing this code segment with a single "SELECT COUNT(*) . . . " query.

In some embodiments, this logic can be incorporated into a development environment (e.g., an IDE) used by a software developer to directly identify queries being written by the developer that may not utilize an index. For example, an IDE can be updated to analyze queries that are being written and determine—using the techniques disclosed herein—whether an existing index would be used to process that particular query. The IDE may be visually updated to provide feedback to the developer regarding index non-utilization, for example, by adding a visual indicator (e.g., an underline or "squiggly" underline beneath a query, an icon placed adjacent to a query) associated with a query that will not, as constructed, leverage an index. The IDE may provide an indication of this non-utilization (encouraging the developer to potentially update the query to use an index), and/or suggest changes to the query that could be made to allow for an index (or a better index) to be used, request permission for the IDE to generate an index for that particular query on the developer's behalf, etc.

Figure 6:
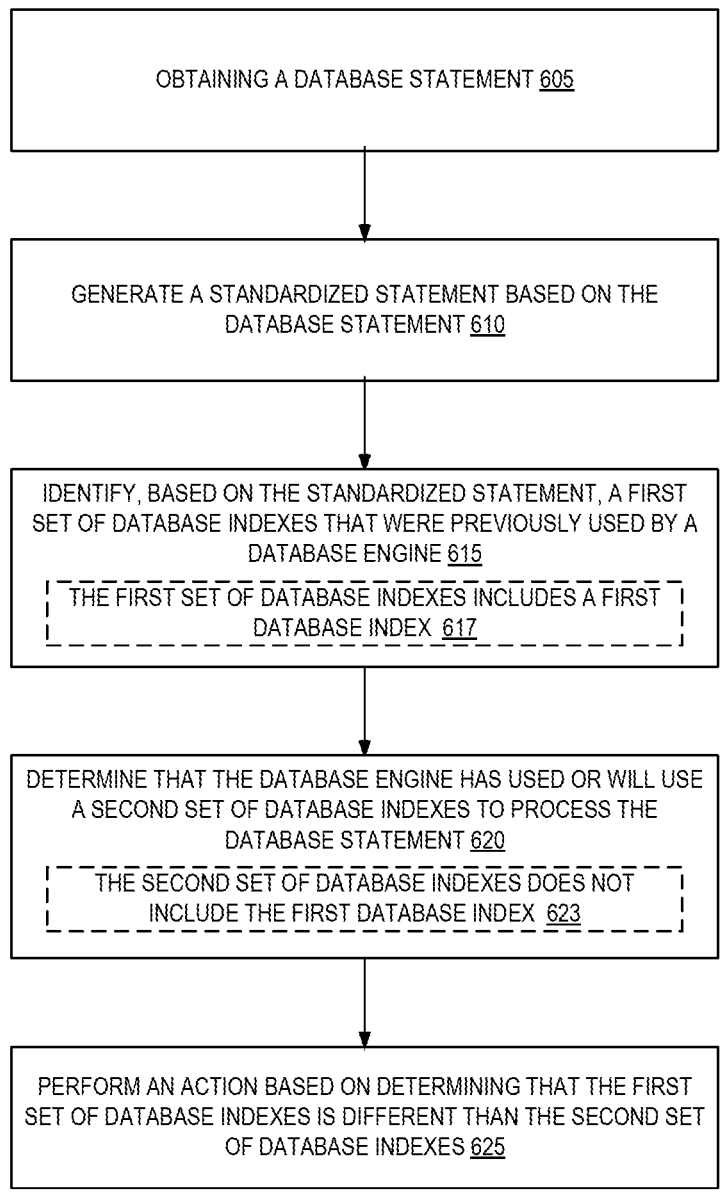
FIG. 6 is a flow diagram illustrating operations of a method for database performance degradation detection according to some embodiments.

FIG. 6 is a flow diagram illustrating operations of a method for database performance degradation detection according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the SPM 122 of the other figures.

The operations 600 include, at block 605, obtaining a database statement. In some embodiments, block 605 includes receiving a query submitted by a client to a database, and in other embodiments block 605 includes sending a command to a database engine to provide a list of currently-executing queries, reading from a query log written to by the database engine, reading from a storage location written to by the database engine, etc. The database statement may be a SQL query. In some embodiments, obtaining the database statement comprises sending a request to the database engine for an identification of currently-executing statements; or analyzing a query log generated by the database engine. In some embodiments, obtaining the database statement comprises receiving, at a database proxy communicatively coupled between a client and the database engine, a request to execute the database statement.

In some embodiments, obtaining the database statement comprises: executing a static program analysis process with a software object to identify the database statement, the software object comprising source code or object code. In some embodiments, the operations 600 further include obtaining the software object associated with a change submitted to a code repository for an application; and designating a build or deployment of the application associated with the change as a failure or sending a message that identifies the change. In some embodiments, the operations 600 further include obtaining metadata describing columns of one or more tables of a database hosted by the database engine and further describing one or more database indexes, the one or more database indexes including the first set of database indexes, wherein determining that the database engine has used or will use a second set of database indexes to process the database statement (in later-described block 620) is based on an analysis of the metadata.

The operations 600 also include, at block 610, generating a standardized statement based on the database statement. In some embodiments, block 610 includes removing one or more values (e.g., "expressions") from the statement. The expressions may be from within a WHERE clause of the statement. The removed values, in some embodiments, are replaced with placeholder values according to a replacement scheme that is consistent in that it will always generate a same standardized statement for a given statement, which insures that all queries of a same type end up with a same standardized query.

The operations 600 further include, at block 615, identifying, based on the standardized statement, a first set of zero, one, or more database indexes that were previously used by a database engine (e.g., to process another query that, when standardized, yields a same standardized statement as generated in block 610). Block 615 may include performing a lookup in a data structure to identify which indexes, if any, were used by one or more other previously-observed statements of a same query type as the query. In some embodiments, block 615 includes block 617, where the first set of database indexes includes at least a first database index.

The operations 600 include, at block 620, determining that a database engine has used or will use a second set of database indexes to process the database statement. Block 420 may include sending a request to the database engine (targeted by the statement) to generate an execution plan for the query (or for the standardized query), receiving a response carrying the execution plan, and analyzing the execution plan to identify any indexes that would be utilized.

In some embodiments, block 620 includes block 623, where the second set of database indexes does not include the first database index—i.e., the first database index has been abandoned for the database statement.

In some embodiments, determining that the database engine has used or will use a second set of database indexes to process the database statement comprises: sending a plurality of commands at a plurality of different points in time to the database engine, each of the plurality of command requesting an execution plan for the database statement or the standardized statement; and receiving a plurality of execution plans, wherein a first one or more of the plurality of execution plans indicate that the first database index would be used to execute the database statement or the standardized statement, and wherein a second one or more of the plurality of execution plans do not indicate that the first database index would be used to execute the database statement or the standardized statement.

The operations 600 include, at block 625, performing an action based on determining that the first set of database indexes is different than the second set of database indexes. Block 625 may include sending a message indicating that the database engine will not or did not utilize one or more of the first set of database indexes to process the database statement, that a new index in the second set of database indexes that is not in the first set of database indexes will be used, etc. The message may be sent to a user or account associated with the database, associated with a client that originated the database statement, etc.

In some embodiments, the operations 600 further include, before the obtaining of the database statement, obtaining a second database statement; generating the standardized statement based on the second database statement; determining that the database engine has used or will use the first set of database indexes to execute the second database statement (e.g., where the first set of database indexes includes zero or more database indexes); and inserting an entry into a data structure to associate the standardized statement with an identifier of the first set of database indexes (e.g., an "empty" value such as a zero or empty string or NULL value indicating that no index is associated and thus the first set of database indexes is empty, an index name of each database index in the first set, etc.). In some embodiments, determining that the database engine would use the database index to execute the second database statement comprises: sending a command to the database engine for an execution plan for the second database statement or the standardized statement; receiving the execution plan from the database engine; and parsing the execution plan to identify an element of the execution plan (e.g., associated with a "key" attribute, as shown in FIG. 3) specifying which database indexes, if any, would be used to process the second database statement or the standardized statement.

In some embodiments, the operations 600 further include determining that a performance metric associated with an execution of the database statement satisfies a criterion based on a statement performance metric associated with the standardized statement, wherein the determining that the database engine will not or did not utilize the database index to process the database statement occurs responsive to the determining that the performance metric satisfies the criterion.

In some embodiments, the operations 600 further include, after determining that the database engine has used or will use the second set of database indexes to process the database statement, transmitting a second database statement to the database engine to create or modify a second database index (e.g., so that it can be used to process statements having a same standardized statement).

Figure 7:
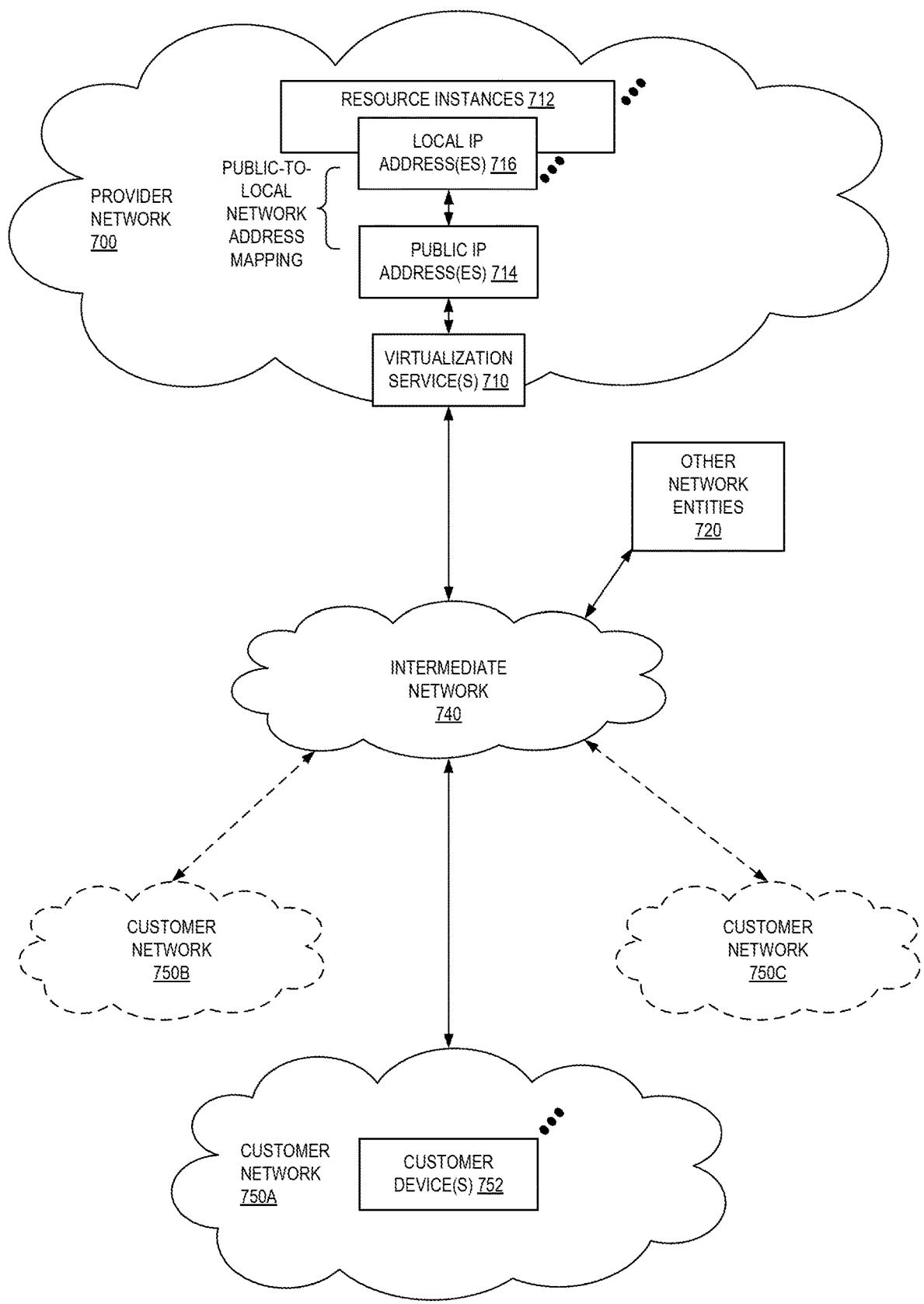
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
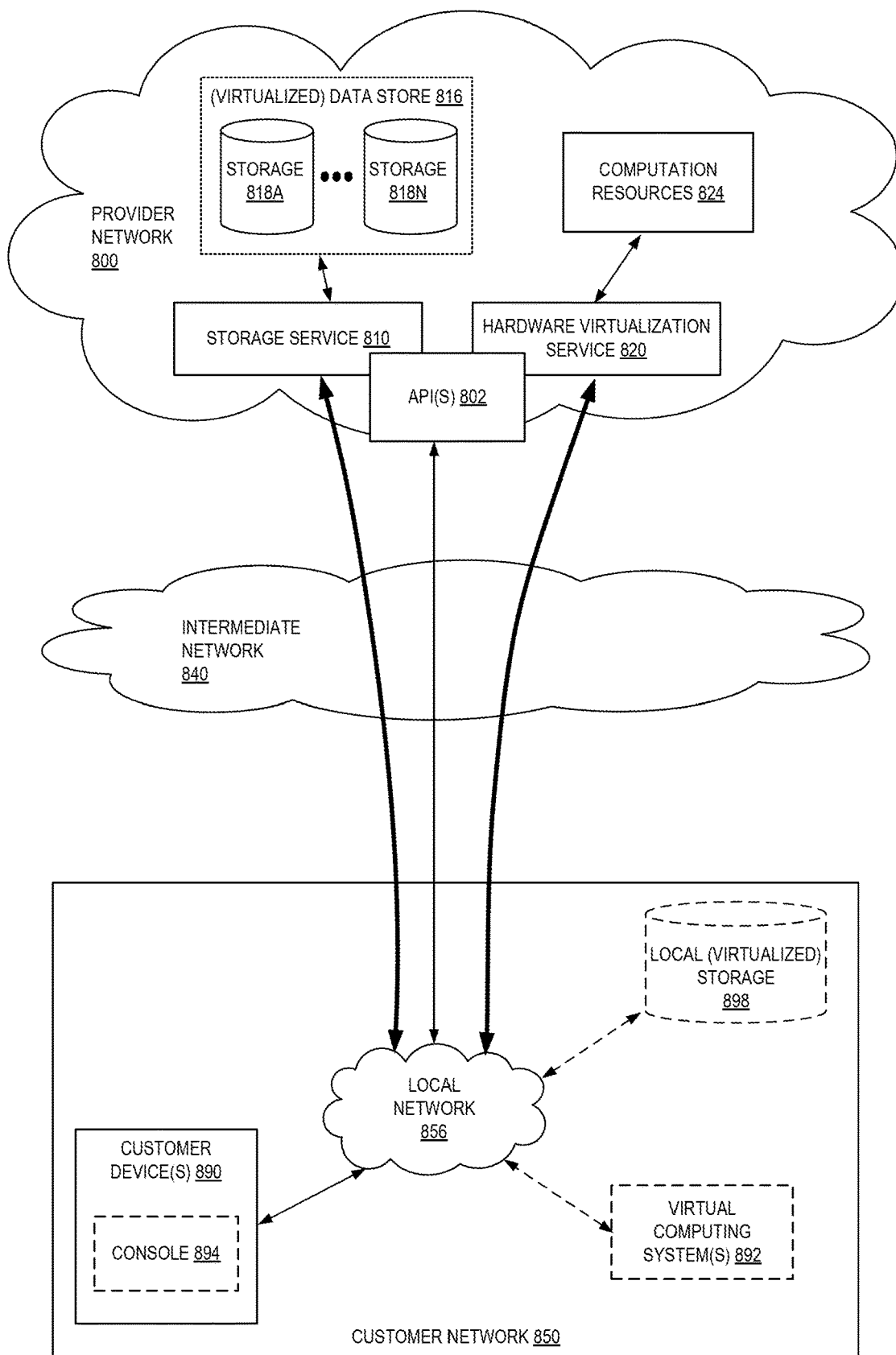
FIG. 8 is a block diagram of an example provider network that provides a storage service and a hardware virtualization service to customers according to some embodiments.

FIG. 8 is a block diagram of an example provider network that provides a storage service and a hardware virtualization service to customers according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
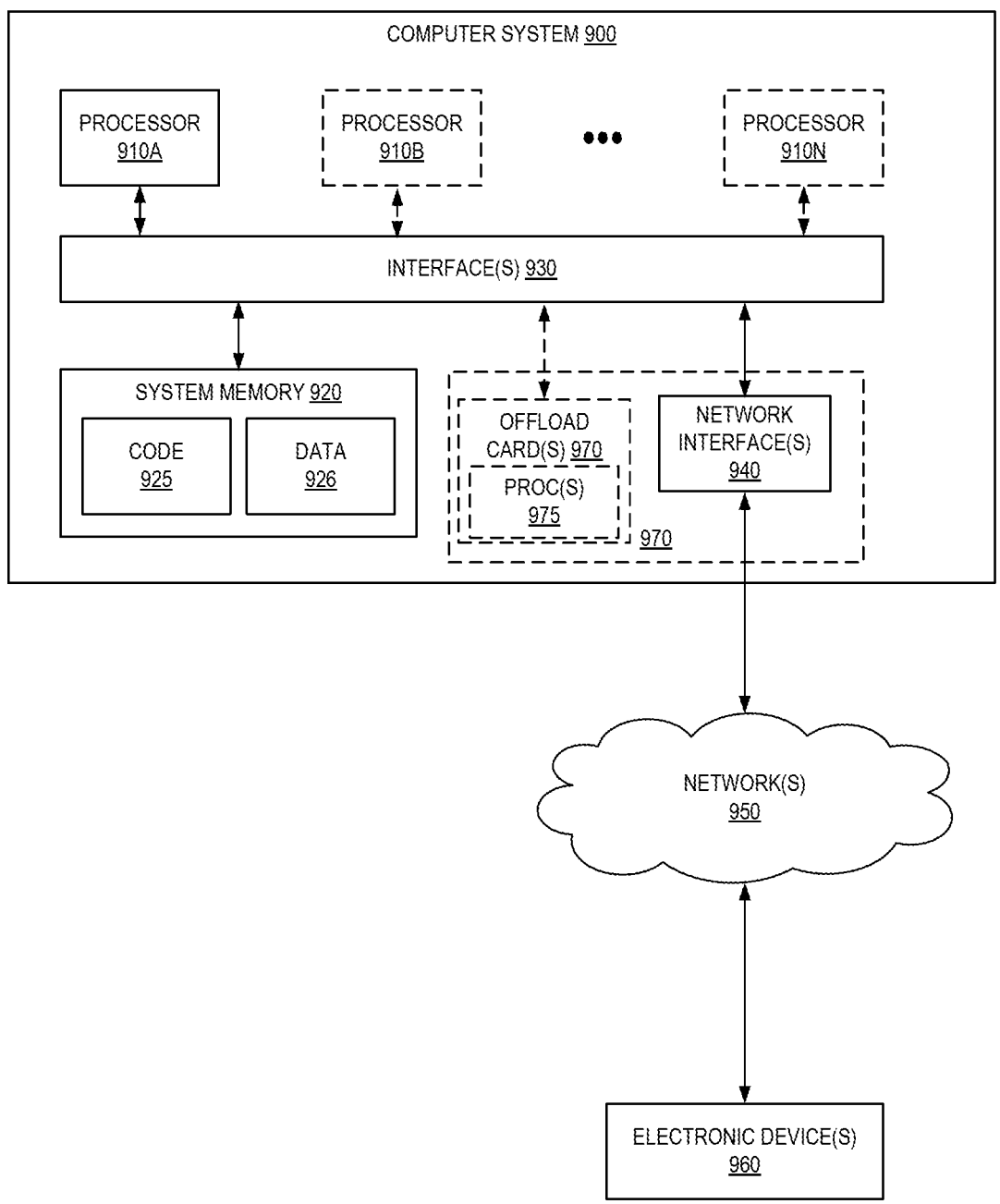
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   obtaining a database statement;
   generating a standardized statement based on the database statement;

identifying, based on the standardized statement, a first set of database indexes that were previously used by a database engine;

determining that the database engine has used or will use a second set of database indexes to process the database statement;

performing an action based on determining that the first set of database indexes is different than the second set of database indexes;

before the obtaining of the database statement, obtaining a second database statement;

generating the standardized statement based on the second database statement;

determining that the database engine has used or will use the first set of database indexes to execute the second database statement, the first set of database indexes including zero or more database indexes, wherein the determining comprises:

sending a command to the database engine for an execution plan for the second database statement or the standardized statement;

receiving the execution plan from the database engine; and parsing the execution plan to identify an element of the execution plan specifying which database indexes, if any, would be used to process the second database statement or the standardized statement; and inserting an entry into a data structure to associate the standardized statement with an identifier of the first set of database indexes.

2. The computer-implemented method of claim 1, further comprising:

determining that a performance metric associated with an execution of the database statement or the standardized statement satisfies a criterion, wherein determining that the database engine has used or will use a second set of database indexes to process the database statement occurs responsive to determining that the performance metric satisfies the criterion.

3. The computer-implemented method of claim 1, wherein obtaining the database statement comprises at least one of:

sending a request to the database engine for an identification of currently-executing statements; or analyzing a query log generated by the database engine.

4. The computer-implemented method of claim 1, wherein obtaining the database statement comprises:

receiving, at a database proxy communicatively coupled between a client and the database engine, a request to execute the database statement.

5. The computer-implemented method of claim 1, wherein determining that the database engine has used or will use a second set of database indexes to process the database statement comprises:

sending a plurality of commands at a plurality of different points in time to the database engine, each of the plurality of command requesting an execution plan for the database statement or the standardized statement; and receiving a plurality of execution plans, wherein a first of the plurality of execution plans indicates that the first set of database indexes would be used to execute the database statement or the standardized statement, and wherein a second of the plurality of execution plans indicates that the second set of database indexes would be used to execute the database statement or the standardized statement.

6. The computer-implemented method of claim 1, wherein the obtaining the database statement comprises:

executing a static program analysis process with a software object to identify the database statement, the software object comprising source code or object code.

7. The computer-implemented method of claim 6, further comprising:

obtaining the software object associated with a change submitted to a code repository for an application; and designating a build or deployment of the application associated with the change as a failure or sending a message that identifies the change.

8. The computer-implemented method of claim 6, further comprising:

obtaining metadata describing columns of one or more tables of a database hosted by the database engine and further describing one or more database indexes, the one or more database indexes including the first set of database indexes, wherein determining that the database engine has used or will use a second set of database indexes to process the database statement is based on an analysis of the metadata.

9. The computer-implemented method of claim 1, wherein:

the first set of database indexes includes one or more indexes;

the second set of database indexes includes no indexes; and the method further comprises, after determining that the database engine has used or will use the second set of database indexes to process the database statement, transmitting a second database statement to the database engine to create or modify a database index.

10. A system comprising:

a database engine implemented by a first one or more electronic devices to process database statements issued by clients that involve one or more tables of a database; and a statement performance monitor implemented by a second one or more electronic devices, the statement performance monitor including instructions that upon execution cause the statement performance monitor to:

obtain a database statement;

generate a standardized statement based on the database statement;

identify, based on the standardized statement, a first set of database indexes that were previously used by the database engine to process at least a second database statement having a same standardized statement; and determine that the database engine has used or will use a second set of database indexes to process the database statement, wherein the first set of database indexes is different than the second set of database indexes, and wherein either the first set of database indexes or the second set of database indexes is empty;

obtain a second database statement;

generate the standardized statement based on the second database statement;

determine that the database engine has used or will use the first set of database indexes to execute the second database statement, wherein to perform the determination the statement performance monitor is to:
send a command to the database engine for an execution plan for the second database statement or the standardized statement;
receive the execution plan from the database engine; and
analyze an element of the execution plan that indicates which indexes, if any, would be utilized to process the second database statement or the standardized statement; and
insert an entry into a data structure to associate the standardized statement with an identifier of the first set of database indexes, wherein the identifier identifies zero database indexes when the first set of database indexes is empty and identifies each of the first set of database indexes when the first set of database indexes is not empty.

11. The system of claim 10, wherein the instructions further cause the statement performance monitor to:
determine that a performance metric associated with an execution of the database statement satisfies a criterion,
wherein the statement performance monitor is to determine that the database engine has used or will use the second set of database indexes to process the database statement in response to the determination that the performance metric satisfies the criterion.

12. The system of claim 10, wherein to obtain the database statement the instructions further cause the statement performance monitor to:
send a request to the database engine for an identification of currently-executing statements; or
analyze a query log generated by the database engine.

13. The system of claim 10, wherein the statement performance monitor is implemented at a database proxy communicatively coupled between a client and the database engine.

14. A computer-implemented method comprising:
obtaining a database statement;
generating a standardized statement based on the database statement;
identifying, based on the standardized statement, a first set of database indexes that were previously used by a database engine;
determining that the database engine has used or will use a second set of database indexes to process the database statement, wherein the determining comprises:
sending a plurality of commands at a plurality of different points in time to the database engine, each of the plurality of command requesting an execution plan for the database statement or the standardized statement; and
receiving a plurality of execution plans,
wherein a first of the plurality of execution plans indicates that the first set of database indexes would be used to execute the database statement or the standardized statement, and
wherein a second of the plurality of execution plans indicates that the second set of database indexes would be used to execute the database statement or the standardized statement; and
performing an action based on determining that the first set of database indexes is different than the second set of database indexes.

15. The computer-implemented method of claim 14, further comprising:
determining that a performance metric associated with an execution of the database statement or the standardized statement satisfies a criterion,
wherein determining that the database engine has used or will use a second set of database indexes to process the database statement occurs responsive to determining that the performance metric satisfies the criterion.

16. The computer-implemented method of claim 14, wherein the obtaining the database statement comprises:
executing a static program analysis process with a software object to identify the database statement, the software object comprising source code or object code.

17. The computer-implemented method of claim 14, wherein:
the first set of database indexes includes one or more indexes;
the second set of database indexes includes no indexes; and
the method further comprises, after determining that the database engine has used or will use the second set of database indexes to process the database statement, transmitting a second database statement to the database engine to create or modify a database index.

18. A system comprising:
a first one or more electronic devices to implement a database engine, the database engine to process database statements issued by clients that involve one or more tables of a database; and
a second one or more electronic devices to implement a statement performance monitor, the statement performance monitor including instructions that upon execution cause the statement performance monitor to:
obtain a database statement;
generate a standardized statement based on the database statement;
identify, based on the standardized statement, a first set of database indexes that were previously used by the database engine;
determine that the database engine has used or will use a second set of database indexes to process the database statement, wherein the statement performance monitor is to:
send a plurality of commands at a plurality of different points in time to the database engine, each of the plurality of command requesting an execution plan for the database statement or the standardized statement; and
receive a plurality of execution plans,
wherein a first of the plurality of execution plans indicates that the first set of database indexes would be used to execute the database statement or the standardized statement, and
wherein a second of the plurality of execution plans indicates that the second set of database indexes would be used to execute the database statement or the standardized statement; and
perform an action based on determining that the first set of database indexes is different than the second set of database indexes.

19. The system of claim 18 wherein the instructions further cause the statement performance monitor to:
determine that a performance metric associated with an execution of the database statement satisfies a criterion,
wherein the statement performance monitor is to determine that the database engine has used or will use the second set of database indexes to process the database statement in response to the determination that the performance metric satisfies the criterion.

20. The system of claim 18, wherein:

the first set of database indexes includes one or more indexes;

the second set of database indexes includes no indexes; and the instructions further cause the statement performance monitor to, after the determination that the database engine has used or will use the second set of database indexes to process the database statement, transmit a second database statement to the database engine to create or modify a database index.

\* \* \* \* \*